(12) United States Patent
Krebs

(10) Patent No.: US 12,044,768 B2
(45) Date of Patent: Jul. 23, 2024

(54) APPARATUS FOR DETERMINING THE DISTANCE FROM A TRANSMITTER TO A RECEIVER

(71) Applicant: Bayerische Motoren Werke Aktiengesellschaft, Munich (DE)

(72) Inventor: Alexander Krebs, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 277 days.

(21) Appl. No.: 17/594,673

(22) PCT Filed: Mar. 31, 2020

(86) PCT No.: PCT/DE2020/100266
§ 371 (c)(1),
(2) Date: Oct. 26, 2021

(87) PCT Pub. No.: WO2020/221390
PCT Pub. Date: Nov. 5, 2020

(65) Prior Publication Data
US 2022/0214436 A1 Jul. 7, 2022

(30) Foreign Application Priority Data
Apr. 30, 2019 (DE) .......................... 102019111245.1

(51) Int. Cl.
*G01S 11/06* (2006.01)
*G01S 5/02* (2010.01)
(Continued)

(52) U.S. Cl.
CPC .............. *G01S 11/06* (2013.01); *G01S 5/0257* (2013.01); *H04B 17/104* (2015.01); *H04B 17/318* (2015.01); *H04W 4/023* (2013.01)

(58) Field of Classification Search
CPC ...... G01S 11/06; G01S 5/0252; G01S 5/0257; G01S 5/0278; H04B 17/104;
(Continued)

(56) References Cited

U.S. PATENT DOCUMENTS 10,267,893 B2 * 4/2019 Gonia ........................ G01S 5/14
2007/0052534 A1 * 3/2007 Bird ....................... G01S 5/0284
340/8.1
(Continued)

FOREIGN PATENT DOCUMENTS

| WO | 03081516 A1 | 10/2003 |
| WO | 2005038480 A1 | 4/2005 |
| WO | 2013085750 A1 | 6/2013 |

*Primary Examiner* — Siu M Lee
(74) *Attorney, Agent, or Firm* — Kieran O'Leary; SPL Patent Attorneys PartG mbB

(57) ABSTRACT

An apparatus for determining the distance from a transmitter to a receiver is proposed, wherein the transmitter and the receiver are configured to communicate via a radio channel. The apparatus comprises at least one measuring unit configured to measure a received signal strength indicator value and a time-of-flight value of the radio channel. The apparatus further comprises a processing unit configured to compare the measured pair of the received signal strength indicator value and the time-of-flight value with stored pairs of received signal strength indicator values and time-of-flight values, wherein the stored pairs of received signal strength indicator values and time-of-flight values are each associated with a distance of the transmitter to the receiver, and wherein the processing unit is configured to determine the distance of the transmitter to the receiver based on the comparison result.

10 Claims, 3 Drawing Sheets

(51) Int. Cl.
*H04B 17/10* (2015.01)
*H04B 17/318* (2015.01)
*H04W 4/02* (2018.01)

(58) Field of Classification Search
CPC . H04B 17/318; H04W 4/023; G07C 9/00309; G07C 2209/63
See application file for complete search history.

(56) References Cited

U.S. PATENT DOCUMENTS

| | | | |
|---|---|---|---|
| 2016/0286500 A1* | 9/2016 | Zur | H04W 52/24 |
| 2018/0249535 A1* | 8/2018 | Seo | H04W 40/02 |
| 2018/0266826 A1* | 9/2018 | Wang | G01C 21/005 |
| 2019/0041508 A1 | 2/2019 | R. et al. | |
| 2020/0213969 A1* | 7/2020 | John | H04B 17/318 |

* cited by examiner

APPARATUS FOR DETERMINING THE DISTANCE FROM A TRANSMITTER TO A RECEIVER

CROSS-REFERENCE TO RELATED APPLICATIONS

This application is a 35 U.S.C. § 371(c) national stage entry of PCT/DE2020/100266, filed on Mar. 31, 2020. That application claimed priority to German Application 10 2019 111 245.1 filed on Apr. 30, 2019. The contents of the earlier filed applications are incorporated by reference herein in their entirety.

FIELD

The present invention relates to an apparatus for determining the distance from a transmitter to a receiver.

BACKGROUND

In various applications, it may be necessary to determine the distance between a transmitter and a receiver. It is known here to estimate the distance based on a received signal strength indicator (RSSI) value. Here, a distance value may be associated with each RSSI value by a laboratory experiment or by mathematical conversion. If the receiver measures a certain RSSI value, it assumes that the distance to the transmitter is similar to the distance that existed in the laboratory experiment at the same RSSI value.

However, the transmitter may experience channel-dependent attenuation. This channel-dependent attenuation of the radio channel between the transmitter and the receiver may change the RSSI value and thus prevent a conversion between RSSI value and distance value from being successful. In this regard, the channel-dependent attenuation is strongly dependent on environmental conditions and user behavior of the transmitter and/or receiver. Therefore, a prediction of a distance based on such a conversion is only an inaccurate estimate of the distance. Especially if the transmitter and/or the receiver are mobile devices, such as smartphones, then user-specific behavior may result in strong deviations of the real from the estimated distance. If a user carries their mobile device in a pocket, for example, the RSSI value may decrease so much that there is an estimation error of more than 100 m between the real and the estimated distance.

If, on the other hand, only a time-of-flight measurement is made, the distance may only be determined in a small range of up to 20 m.

It is therefore an object of the present invention to enable a more accurate estimate of a distance for a wider range between a transmitter and a receiver.

SUMMARY

This object is solved by an apparatus for determining the distance from a transmitter to a receiver according to patent claim 1.

In this context, the transmitter and the receiver are configured to communicate via a radio channel. In order to improve the accuracy of the determination of the distance compared to previous systems, the apparatus comprises at least one measuring unit configured to measure a received signal strength indicator (RSSI) value and a time-of-flight (ToF) value of the radio channel. The time-of-flight measurement measures the time interval between the transmission and the reception of a signal. The measurement of the received signal strength indicator value or RSSI value may be done in different ways and often comprises only an inaccurate relationship with the received signal energy. Ideally, however, the measurement of the RSSI value comprises the power of the received useful signal.

The apparatus further comprises a processing unit configured to compare the measured pair of the received signal strength indicator value and the time-of-flight value with stored pairs of received signal strength indicator values and time-of-flight values. The stored pairs of received signal strength indicator values and time-of-flight values are each associated with a distance of the transmitter to the receiver. The processing unit is further configured to determine the distance of the transmitter to the receiver based on the comparison result.

Unlike previous systems in which only one RSSI value, i.e., a single received signal strength indicator value, is used to determine the distance from a transmitter to a receiver, the apparatus proposed herein uses two different values, namely, a received signal strength indicator value and a time-of-flight value. By using the two different values, it is possible to improve the distance determination. In particular, if the RSSI value is influenced due to a channel-dependent attenuation, it is still possible to perform an accurate determination of the distance between transmitter and receiver by means of the corresponding time-of-flight value. The time-of-flight value may be used as a correction factor for the received signal strength indicator value.

According to one embodiment, the stored pairs are transmitter-specific. In this way, it may be achieved that special characteristics of the transmitter, in particular user behavior, which influences the transmitter characteristics, are taken into account when storing the pairs. Thus, the determination of the distance may be further improved, as this transmitter-specific behavior is also taken into account when determining the distance.

According to a further embodiment, the processing unit is configured to determine the identity of the transmitter. If the identity of the transmitter is determined prior to determining the distance and measuring the received signal strength indicator value and the time-of-flight value, it is possible to determine the comparison directly based on transmitter-specific pairs of received signal strength indicator values and time-of-flight values. In particular, respective pairs of received signal strength indicator values and flight of time values may be stored for different transmitters, with the appropriate number of pairs being selected to determine the distance based on the identity of the transmitter.

To determine the identity of the transmitter, the processing unit may be configured to receive authentication information from the transmitter. This authentication information may be exchanged between the transmitter and the receiver by means of a suitable radio protocol. For example, it is possible to exchange the authentication information as a cryptographic key between the transmitter and the receiver.

According to a further embodiment, the measuring unit is configured to perform the measurement of the received signal strength indicator value simultaneously with the measurement of the time-of-flight value. In this regard, the measurement of the values is performed simultaneously or at least closely together in time. In this way, pairs of measurements of a received signal strength indicator value and a time-of-flight value for the transmitter may be determined that occur at the same or substantially the same time.

The measuring unit may further be configured to perform the measurement of the pair of the received signal strength indicator value and the time-of-flight value n times. These n times measurements may be used by the processing unit to determine and store a transmitter-specific probabilistic relationship for the pairs of received signal strength indicator values and time-of-flight values. This probabilistic relationship may be determined, for example, by a histogram, a statistical mean value, a minimum/maximum calculation, or the like.

By establishing such a transmitter-specific probabilistic relationship between the received signal strength indicator value and the time-of-flight value, the device- and user-specific characteristics of the radio channel for the respective transmitter as well as the influence of the environmental conditions in which the transmitter is located may be statistically recorded and evaluated. Thus, as the number of measurements of the received signal strength indicator values and the time-of-flight values increases, the processing unit is able to determine and/or to estimate the distance of the receiver to the transmitter with higher accuracy.

According to another embodiment, the processing unit is configured to calculate the distance between the transmitter and the receiver in a first range (e.g., up to 20 m) and is configured to estimate the distance between the transmitter and the receiver in a second range (e.g., 20-100 m) based on the stored probabilistic relationship. The combination of a received signal strength indicator value and a time-of-flight value therefore allows for a determination over a larger distance range. The time-of-flight value may be used to determine the distance in a close range up to approx. 20 m. Using the received signal strength indicator value, the measuring range of the time-of-flight measurement may be extended to a larger range, e.g., up to approx. 100 m, by extrapolating the probabilistic relationship.

To further improve the determination of the distance, the processing unit may be configured to adjust the stored probabilistic relationship at predefined intervals or continuously. In this way, a change in the transmitter characteristics, such as when the user places the transmitter in a housing or removes it from a housing, may be accounted for in determining the distance in the future.

The determination and/or estimation of the distance may be determined using the currently measured received signal strength indicator value and the time-of-flight value as well as the stored transmitter-specific received signal strength indicator values and time-of-flight values and their stored probabilistic statistics. Here an extrapolation function, for example a Taylor approximation, may be used to estimate what the current distance is based on the current and stored values. In particular, if certain values are already stored only for the close range, such an extrapolation function may also be used to determine the distance in a larger range, for example a range in which only RSSI values exist.

By means of a histogram, for example, it is possible to estimate, for a current RSSI value of a transmitter, with which probability a certain distance exists. In addition, a quality criterion for the statistical significance of the histogram may be used. The quality criterion may be used to classify values for distances as irrelevant or relevant. Therefore, if many measurements with many pairs of values are available, the estimation of the distance is improved. The apparatus may be implemented as a self-learning system.

The measuring unit may further be configured to perform the measurement of the received signal strength indicator value via an ultra-wideband link (UWB) and/or be configured to perform the measurement of the time-of-flight value via a BLE link. By combining the two measurements in the range up to 20 m, these measurements may be converted to distances for the range 20 m-100 m. The overlapping range 0 m-20 m between the time-of-flight measurements and the RSSI measurements may be approximated by a functional relationship and be extrapolated for the range of values 20 m-100 m. In this way, distance measurements may be made over 20 m.

According to another embodiment, the transmitter is a mobile device and/or the receiver is a motor vehicle. For example, the apparatus may be used to unlock a motor vehicle using the distance of the transmitter, i.e., the mobile device, to the receiver, i.e., the motor vehicle, to determine whether the user is already within range of the motor vehicle and therefore the motor vehicle should be unlocked. The mobile device may be, for example, a mobile phone, smartphone, PDA, tablet, or the like. Furthermore, based on the determination of the distance of the transmitter to the receiver, adjustments may be made to the receiver. For example, if the receiver is a motor vehicle, the motor vehicle may make personalized adjustments, such as a seat adjustment, etc., based on the distance determination.

Furthermore, a method of determining the distance from a transmitter to a receiver is proposed, wherein the transmitter and the receiver are configured to communicate via a radio channel. The method comprises the following steps: measuring a received signal strength indicator value and a time-of-flight value of the radio channel, comparing the measured pair of the received signal strength indicator value and the time-of-flight value with stored pairs of received signal strength indicator values and time-of-flight values, wherein the stored pairs of received signal strength indicator values and time-of-flight values are each associated with a distance of the transmitter to the receiver, and determining the distance of the transmitter to the receiver based on the comparison result.

The embodiments and features described for the proposed apparatus apply accordingly to the proposed method.

Furthermore, a computer program product is proposed which comprises a program code which is configured to cause a computer to execute the method as described above.

A computer program product, such as a computer program means, may be provided or delivered, for example, as a storage medium, such as a memory card, USB stick, CD-ROM, DVD, or in the form of a downloadable file from a server in a network. For example, in a wireless communication network, this may be done by transmitting a corresponding file with the computer program product or computer program means.

Further possible implementations of the invention also include combinations of features or embodiments not explicitly mentioned before or in the following regarding the embodiments. The person skilled in the art will also add individual aspects as improvements or additions to the respective basic form of the invention.

Further advantages and advantageous embodiments are indicated in the description, drawings and claims. In particular, the combinations of the features indicated in the description and the drawings are purely exemplary, so that the features may also be present individually or in other combinations.

In the following, the invention shall be described in more detail by means of embodiments shown in the drawings. Here, the embodiments and the combinations shown in the embodiments are purely exemplary and are not intended to define the scope of the invention. This is defined solely by the pending claims.

DETAILED DESCRIPTION

Figure 1:
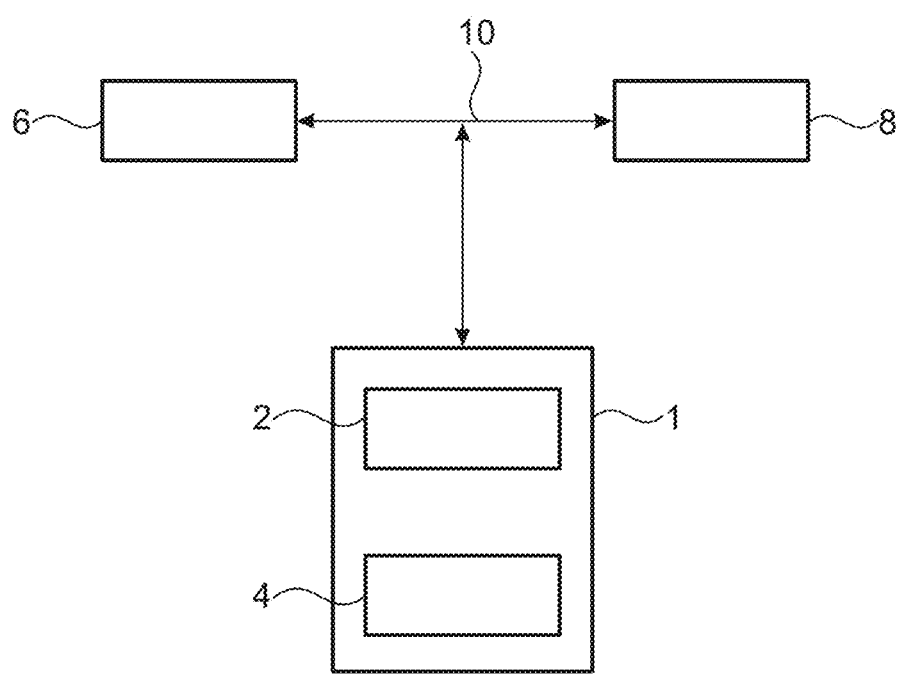
FIG. 1 shows a schematic block diagram of a system comprising an apparatus for determining the distance between a transmitter and a receiver.

In the following, identical or functionally equivalent elements are designated by the same reference numerals.

FIG. 1 shows a system 100 comprising a transmitter 6 and a receiver 8. The transmitter 6 and the receiver 8 may communicate via a radio channel 10. The transmitter 6 may be, for example, a mobile device such as a smartphone. For example, the receiver 8 may be a motor vehicle or part of a motor vehicle.

To determine a distance between the transmitter 6 and the receiver 8, an apparatus 1 is provided. For example, the apparatus 1 may be integrated with the receiver 8 in a motor vehicle. Based on the distance between the transmitter 6 and the receiver 8, adjustments may be made to the receiver 8 or a device connected thereto, such as a motor vehicle. The determined distance may be used to unlock a motor vehicle when the transmitter 6 is within a defined distance range from the receiver 8.

To determine the distance between the transmitter 6 and the receiver 8, the apparatus 1 comprises one or several measuring units 2. The measuring unit 2 is configured to measure a received signal strength indicator value and a time-of-flight value of the radio channel 10 between the transmitter 6 and the receiver 8. The time-of-flight measurement measures the time interval between the transmission and the reception of a signal. The measurement of the received signal strength indicator value or RSSI value ideally comprises the power of the received useful signal.

Based on this pair of measurements, the processing unit 4 may determine the distance between the transmitter 6 and the receiver 8. For this purpose, the measured pair of received signal strength indicator value and time-of-flight value is compared with already stored pairs of received signal strength indicator values and time-of-flight values. The stored pairs are each associated with a distance of the transmitter 6 to the receiver 8. Based on the comparison result, the processing unit may determine the distance of the transmitter 6 to the receiver 8.

In particular, the apparatus 1 may be used as a self-learning system. In this case, the measuring unit 2 measures received signal strength indicator values and time-of-flight values continuously or at specified intervals simultaneously or substantially simultaneously. Based on these n times measurements, the processing unit 4 may determine a transmitter-specific probabilistic relationship for the pairs of received signal strength indicator values and time-of-flight values and may store this relationship. When new time-of-flight values and received signal strength indicator values are measured, the processing unit 4 may further refine this probabilistic relationship. As the number of measurements of the received signal strength indicator values and the time-of-flight values increases, the processing unit 4 is able to determine the distance of the receiver 8 to the transmitter 6 with higher accuracy.

By establishing such a transmitter-specific probabilistic relationship between the received signal strength indicator value and the time-of-flight value, the device- and user-specific characteristics of the radio channel 10 for the respective transmitter 6 as well as the influence of the environmental conditions in which the transmitter 6 is located may be statistically recorded and evaluated.

Figure 2:
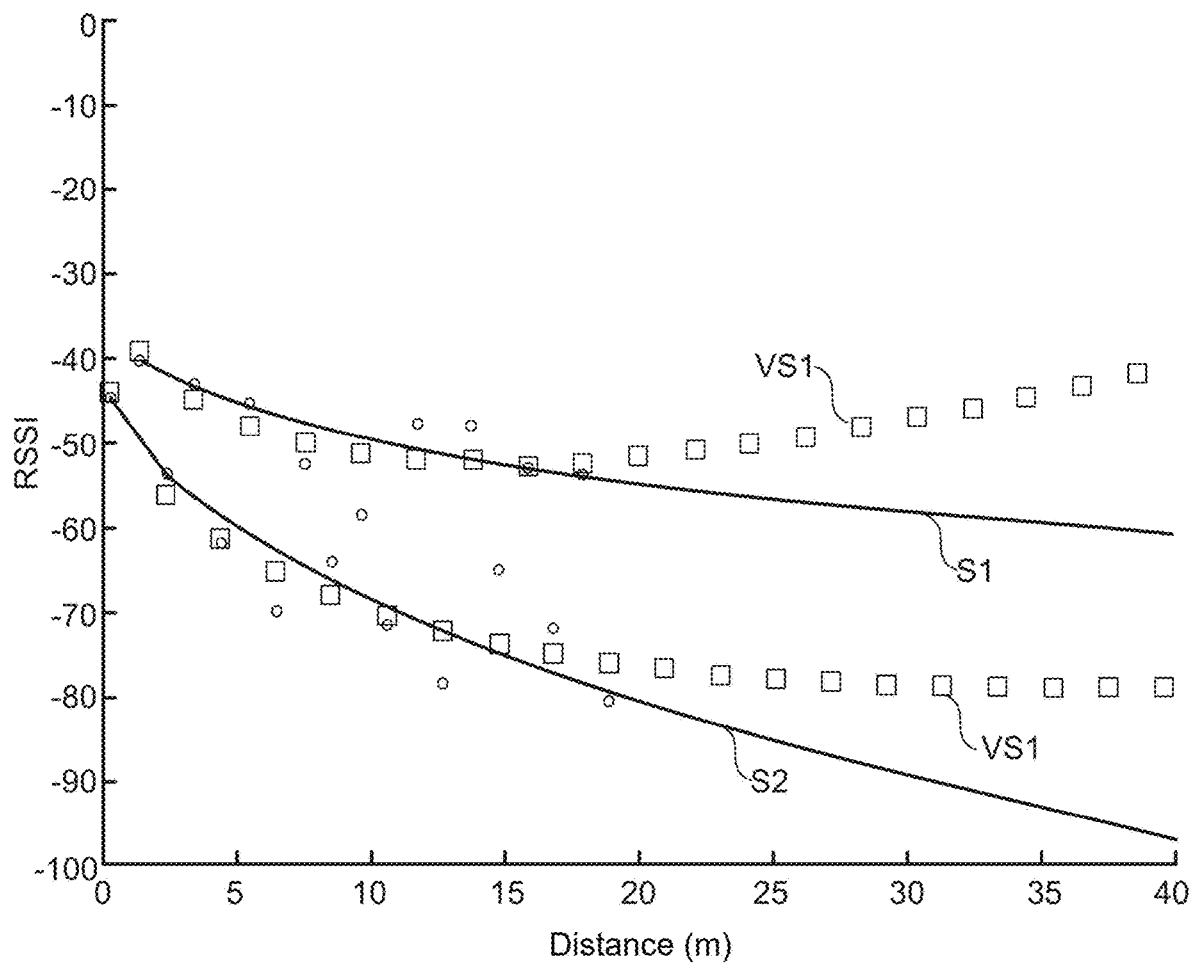
FIG. 2 shows a diagram of a distance estimation for two transmitters after a measurement.
Figure 3:
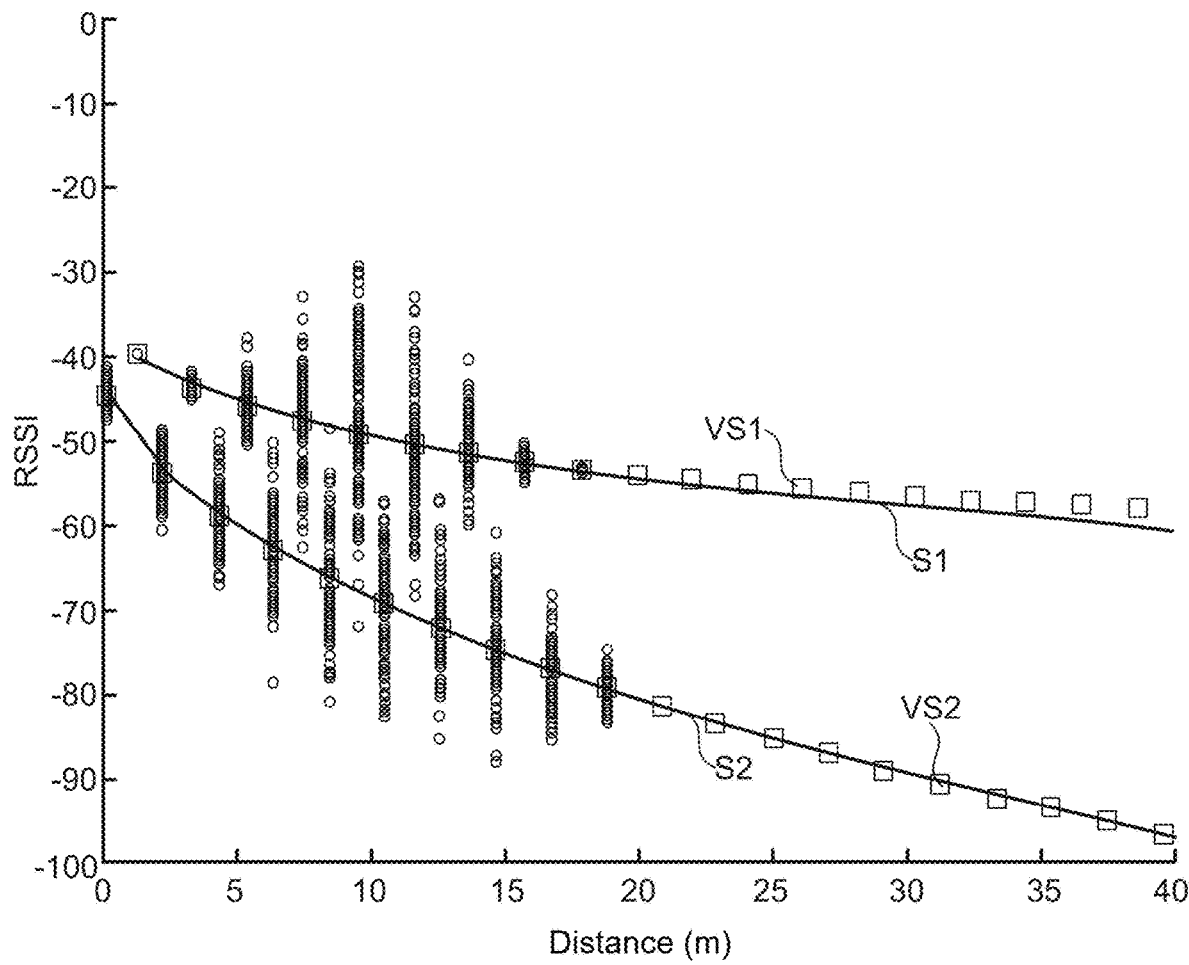
FIG. 3 shows a diagram of a distance measurement for two transmitters after 100 measurements.

This is illustrated in FIGS. 2 and 3, wherein FIG. 2 shows, firstly, the actual distance of a first transmitter to a receiver and a second transmitter to a receiver as curves S1, S2, and further shows the prediction VS1 for transmitter S1 and the prediction VS2 for transmitter S2 after a one-time measurement of an RSSI value and a received signal strength indicator value.

The circles shown around curves S1 and S2 show the received signal strength indicator values measured for transmitter S1 and transmitter S2. As can be seen, the received signal strength indicator value measurements vary greatly around the actual distance S1, S2. Based on only one measurement of a received signal strength indicator value and a time-of-flight value, the respective prediction VS1, VS2 is possible, but it is only accurate up to a distance of approx. 15 to 20 m. At a higher distance range, the VS1, VS2 predictions become very inaccurate.

However, this estimate of the distance becomes more accurate as the number of measurements increases, as shown in FIG. 3 after 100 measurements. The actual distance curves S1, S2 are also shown here. The predictions VS1, VS2 are here clearly approximated to the actual curves. As shown by the circles, the measurements of the received signal strength indicator values vary greatly around the actual curves S1, S2. However, as the received signal strength indicator values are always measured together with a time-of-flight value and are integrated into the probabilistic relationship, the prediction may be improved for further received signal strength indicator values. The time-of-flight value serves, so to speak, as a correction factor for the received signal strength indicator value.

The combination of a received signal strength indicator value and a time-of-flight value further allows for a determination over a larger distance range, as is also shown in FIGS. 2 and 3. For distances greater than 20 m, the estimation of the distance is extended to a larger range by extrapolating the probabilistic relationship. Only one received signal strength indicator value may be measured in this range. However, in this case, too, the estimation of the distance by extrapolation improves with increasing number of measurements of pairs from received signal strength indicator value and time-of-flight measurement, as become clear when looking at the predictions VS1, VS2.

The apparatus proposed herein thus makes it possible to improve the determination of the distance between a transmitter and a receiver using two different values, namely a time-of-flight value and a received signal strength indicator value. In this regard, the determination of the distance becomes more accurate with increasing number of measurements.

REFERENCE NUMERALS

1 Apparatus
2 Measuring unit
4 Processing unit
6 Transmitter
8 Receiver
10 Radio channel
100 System
S1, S2 Transmitter
VS1, VS2 Prediction

The invention claimed is:

1. An apparatus integrated with a receiver for determining the distance from a transmitter to the receiver, wherein the transmitter and the receiver are configured to communicate via a radio channel, the apparatus comprises:
   at least one measurer configured to measure a received signal strength indicator value and a time-of-flight value of the radio channel, and
   a processor configured to compare the measured pair of the received signal strength indicator value and the time-of-flight value with stored pairs of received signal strength indicator values and time-of-flight values,
      wherein the stored pairs of received signal strength indicator values and time-of-flight values are each associated with a distance of the transmitter to the receiver, and
      wherein the processor is configured to determine the distance of the transmitter to the receiver based on the comparison result.

2. The apparatus according to claim 1, wherein the stored pairs are transmitter-specific.

3. The apparatus according to claim 1, wherein the processor is configured to determine the identity of the transmitter and receive authentication information from the transmitter.

4. The apparatus according to claim 1, wherein the measurer is configured to perform the measurement of the received signal strength indicator value simultaneously with the measurement of the time-of-flight value.

5. The apparatus according to claim 1, wherein the measurer is configured to perform the measurement of the pair of the received signal strength indicator value and the time-of-flight value n times.

6. The apparatus according to claim 5, wherein the processor is configured to determine and store a transmitter-specific probabilistic relationship for the pairs of received signal strength indicator values and time-of-flight values based on the n times of measurements of pairs of a received signal strength indicator value and a time-of-flight value.

7. The apparatus according to claim 6, wherein the processor is configured to calculate the distance between the transmitter and the receiver in a first range and is configured to estimate the distance between the transmitter and the receiver in a second range based on the stored probabilistic relationship.

8. The apparatus according to claim 6, wherein the processor is configured to adjust the stored probabilistic relationship at predefined intervals or continuously.

9. The apparatus according to claim 1, wherein the measurer is configured to perform the measurement of the received signal strength indicator value via an ultra-wide-band link and/or is configured to perform the measurement of the time-of-flight value via a BLE link.

10. The apparatus according to claim 1, wherein the transmitter is a mobile device and/or wherein the receiver is a motor vehicle.

* * * * *